Figure 1:
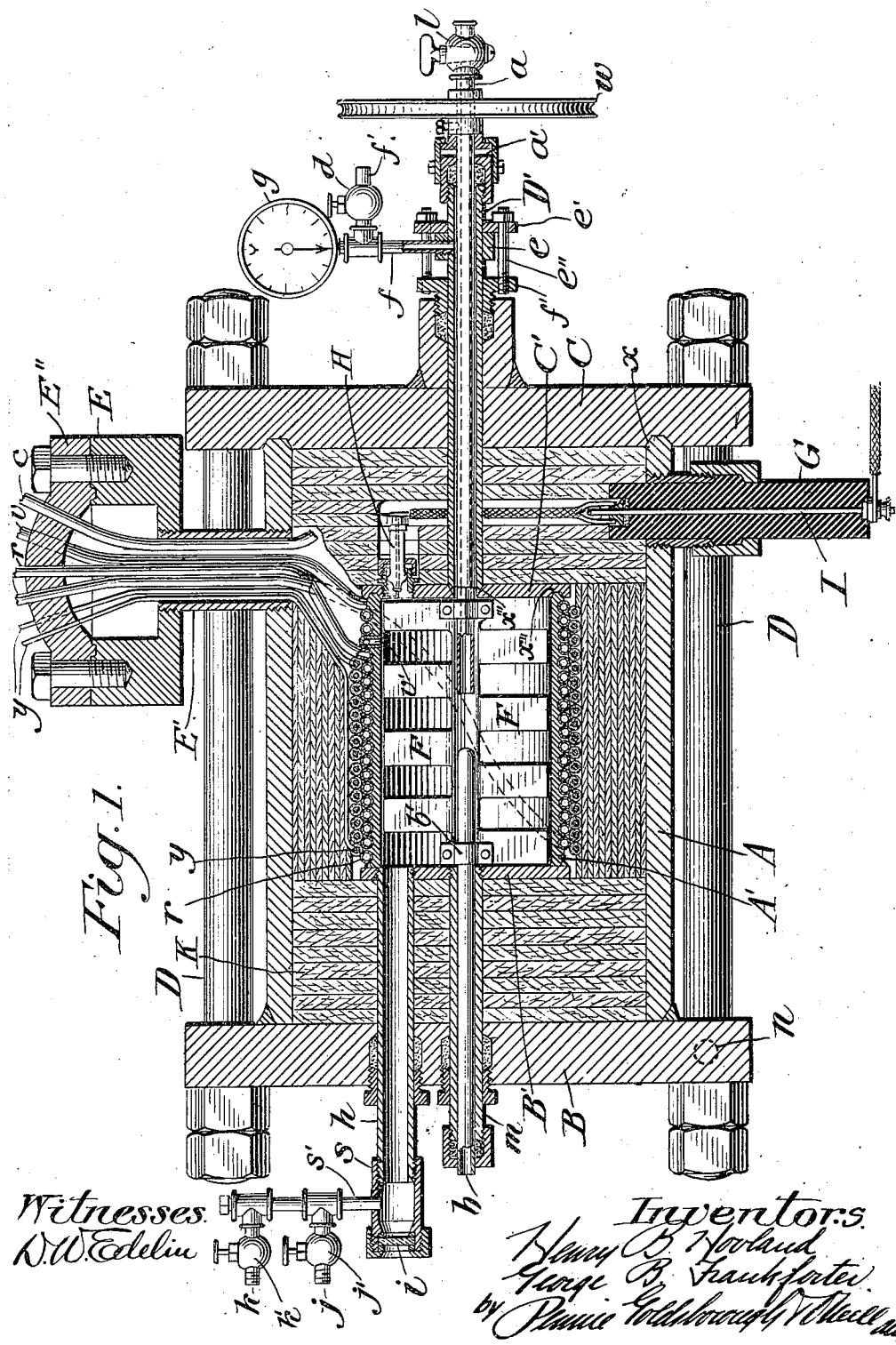

H. B. HOVLAND & G. B. FRANKFORTER.
METHOD OF SULFATING MATERIALS.
APPLICATION FILED MAY 15, 1915.

1,159,032.

Patented Nov. 2, 1915.
2 SHEETS—SHEET 1.

Witnesses
D. W. Edelin

Inventors
Henry B. Hovland
George B. Frankforter
by Pennie Goldsborough & O'Neill attys

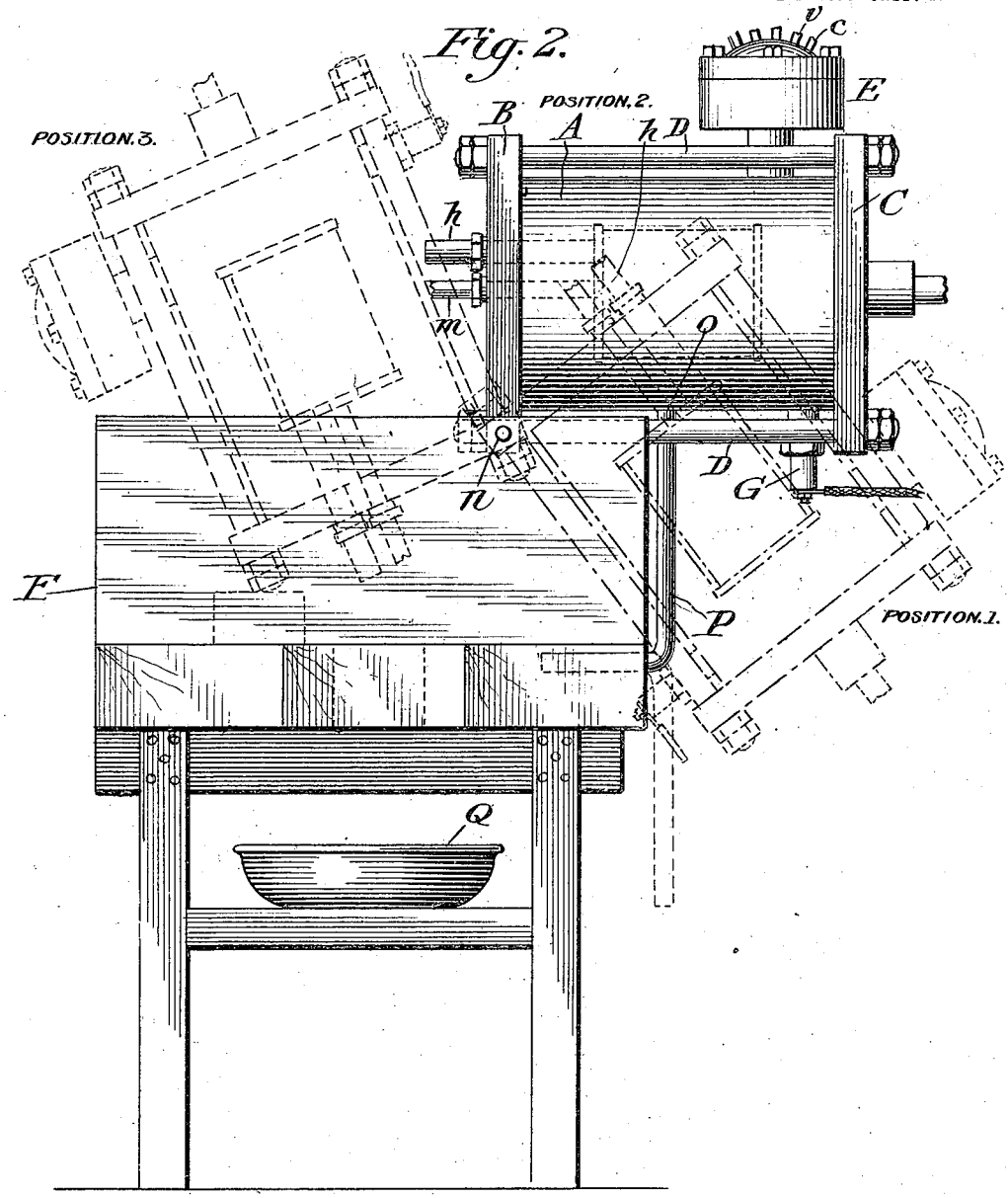

# UNITED STATES PATENT OFFICE.

HENRY B. HOVLAND, OF DULUTH, AND GEORGE B. FRANKFORTER, OF MINNEAPOLIS, MINNESOTA; SAID FRANKFORTER ASSIGNOR TO SAID HOVLAND.

METHOD OF SULFATING MATERIALS.

1,159,032.  Specification of Letters Patent.  Patented Nov. 2, 1915.

Application filed May 15, 1915. Serial No. 28,308.

*To all whom it may concern:*

Be it known that we, HENRY B. HOVLAND and GEORGE B. FRANKFORTER, citizens of the United States, residing at Duluth, county of St. Louis, and Minneapolis, county of Hennepin, Minnesota, respectively, have invented certain new and useful Improvements in Methods of Sulfating Materials; and we do hereby declare the following to be a full, clear, and exact description of the invention, such as will enable others skilled in the art to which it appertains to make and use the same.

This invention relates to the process of sulfating ores or other materials and has for its object to provide an improved process having the advantages hereinafter set forth.

We have discovered that pressures above atmospheric pressure applied to available oxygen in the presence of a sulfur-yielding substance, such as sulfurous acid, greatly promote the chemical reactions between these constituents and other substances, such as ores, metals, metallic compounds, earths, alkalis, and organic compounds, the most important reaction being the formation of compounds containing the sulfuric acid radical ($SO_4$). This discovery is of considerable importance in the metallurgical art, as it renders possible an improved process of recovering metals from metalliferous materials, such as ores and the like. The improved process has been found especially valuable in sulfating copper-bearing ores to recover the copper and therefore the treatment of copper ores in particular will be specifically described to illustrate the application of the process, it being understood that the invention is not limited to the treatment of copper ores or even ores in general, but may be applied wherever sulfating may be desirable. For instance, the invention is applicable to the treatment of organic compounds, such as alcohol, especially in the preparation of common ether; the benzin derivatives as toluene and xylene preparatory to making the phenols and also naphthalene preparatory to the preparation of the naphthols.
In carrying out the process, the material to be treated, such as copper-bearing ore, is subjected to the action of sulfurous acid while in the presence of available oxygen, the latter being oxygen in combination, such as manganese-dioxid, etc., or oxygen in a permanent gas or fluid, such as pure oxygen or air. The sulfurous acid and the available oxygen are caused to be under pressure at the time of acting upon the ore either by supplying the sulfurous acid, or oxygen, or both, while under pressure or creating the pressure necessary for promoting the reaction in any other suitable manner. In practice, it has been found advisable to place the ore in a suitable chamber and to admit the sulfurous acid and oxygen under pressure. Although the sulfurous acid and oxygen are preferably admitted in the form of a mixture under pressure, it is obvious that the sulfurous acid may be formed in the chamber. Furthermore, the oxygen and sulfurous acid may be admitted singly, and either or both be under pressure.

The chemical reactions are greatly promoted due to the fact that the sulfurous acid and oxygen are under pressure and the yield of metal, when metalliferous materials are treated, is considerably increased. The heat of the reaction is sufficient in some instances to maintain the temperature at the desired degree and therefore no additional heating is necessary. In other instances the heat developed by the reaction may be too great and cooling will have to be resorted to. In still other instances, it may be necessary to furnish additional heat during the reaction. This furnishing of additional heat and cooling depends upon the type of apparatus used and the quantity of heat absorbed by the sulfurous acid and oxygen in passing through or being held in the container. It may also be desirable to agitate or stir the ore while being treated by any suitable means, such as that hereinafter referred to.

In the treatment of sulfid ores the sulfurous acid liberated may be sufficient for the sulfating purposes and in this instance, it is only necessary to admit to the container the oxidizing agent under pressure, and if it be necessary to maintain a current of the oxidizing agent over the said ore, any sulfurous acid liberated but not immediately taken up in reaction is mixed with the oxidizing agent and returned to the charge. If the ore itself is not capable of furnishing the necessary sulfurous acid, a sulfur-yielding substance, such as iron pyrite, may be added to the ore. In any event, it will be noted that the material to be sulfated, sulfurous acid, and an oxidizing agent, are brought together under pressure regardless of how the sulfurous acid is furnished and how the constituents are placed under pressure during the reaction.

Any suitable apparatus may be employed for carrying out the process, but to give a clear understanding of the invention, one form of apparatus has been herein illustrated and will be hereinafter described. Only so much of the apparatus as will give a correct understanding of the process will be described in detail, as the apparatus is fully disclosed in the co-pending application of Henry B. Hovland, Serial No. 30,749 filed May 27, 1915.

In the accompanying drawings:—Figure 1 is a vertical section of the reaction chamber and its associated parts; and Fig. 2 is a side elevation showing the reaction chamber pivotally mounted upon a supporting structure.

In the drawing, A represents a strong cylindrical casing, preferably of metal, to the one end of which is welded a metallic plate B. The other end of the casing is closed by metallic plate C held firmly against shoulder $x$ to form a gas-tight joint. Retaining bolts D preferably pass through suitable openings in the end plates B and C, and serve to rigidly clamp the end plates to the casing A and to reinforce the container formed by the casing A and end plates B and C to render it capable of withstanding high internal pressures.

Within the container formed as above described, is positioned the reaction chamber proper, which consists of a metallic cylinder A', the one end of which is welded to plate B'. The other end of the chamber is closed by cover C' held firmly against the shoulder $x''$ to form a gas-tight joint. The end plate C' is provided with an opening to receive the extremity of a hollow tube or trunnion D', as clearly shown in Fig. 1, which trunnion has an end thrust imparted thereto which tends to clamp the parts of the reaction casing together. This end thrust is caused by a collar $e$ secured to the trunnion D', and which is engaged by a plate $e'$, which in turn is acted upon by the draw-bolts $e''$ threaded into any suitable stationary part of the construction, such as that shown at $f'$. By tightening the draw-bolts $e''$, it is obvious that the end thrust of the trunnion D' may be increased. By its end thrust trunnion D' is held firmly against cover C' on the seat $x'''$, thus forming a gas-tight joint.

Passing through the hollow trunnion D' is a hollow shaft or tube $a$ capable of being rotated by the pulley $w$ secured thereto. A stuffing box, denoted generally by the reference character $a'$, is preferably provided where the tube $a$ enters the trunnion D'. The tube $a$ extends into the reaction chamber and is secured to one end of a rotatable rabble, indicated at F. The other end of the rabble is supported at $b'$ upon the extremity of a pyrometer tube $b$ passing through the hollow trunnion $m$ secured to the end plate B' and passing outwardly through the end plate B of the outer casing.

One end of the reaction chamber is provided with an opening for the reception of an electric arc-producing plug, indicated at H, to which electric current is supplied by means of an insulated conductor I surrounded by the insulating material G, where it passes through the outside casing, as will be clear from an inspection of Fig. 1.

Directly opposite the arc-producing plug H, and positioned in the end plate B', is an opening for the reception of the extremity of a tube $h$ passing outwardly through the end plate B of the outside casing and provided at its outer end with a sleeve $s$, carrying a sight-glass $i$, through which the arc-producing plug H may be viewed. In addition to permitting the operation of the arc-producing plug to be viewed, the tube $h$ also serves as a filling inlet for the reaction chamber and a discharge outlet, as will hereinafter appear. For this purpose, the sleeve $s$ is made removable by having a threaded engagement with the extremity of the tube $h$, as clearly shown in Fig. 1. The sleeve $s$ carries a piece of piping $s'$, which in turn has two branches $j$ and $k$ provided with valves $j'$ and $k'$, respectively.

The interior of the hollow trunnion D' communicates at a suitable point in its length with a pipe section $f$ communicating with a combined vacuum and pressure gage $g$, and also with a branch pipe $f'$, the passage in which is controlled by the valve $d$. The central passage in the tube $a$ is controlled by means of a valve $l$, preferably positioned at the extremity of the tube, as shown in Fig. 1.

A cooling coil $r$ is wound around the cylinder A' of the reaction chamber, and its extremities are passed upwardly and outwardly through an outlet pipe E' carrying an outlet box E, through the cover E'' of which the extremities of the cooling tube pass.

Wound upon the coils of the cooling tube $r$ is an insulated electrical conductor $y$, the extremities of which are also passed upwardly through the outlet E' and through the cover E'' of the outlet box E. A single pipe section $v$, passes through the cover E'', then through the pipe section E', and around the extremity of the cylinder A' several times, after which it communicates with the interior of the reaction chamber, as shown at $v'$. If any steam is needed in the reaction chamber, water is supplied to the tube $v$, and in passing around the cylinder A', is converted into steam before the inlet $v'$ is reached. Still another tube or pipe section c passes through the cover E″ of the outlet box E and serves to supply nitrogen or other inert gas to the space between the outside casing and the inner reaction casing. It is important that the tubes r, v and c, and the two portions of the electrical conductor y pass through the cover E″ in a gas-tight manner. The space between the reaction casing and the outside casing is filled with asbestos K, which may be laminated if desired, as shown in the drawing.

The apparatus above described is preferably pivotally mounted as at n upon a suitable supporting structure F, and is normally held in its working position, indicated as "Position 2," by means of a prop P. This prop is capable of dropping to the dotted-line position shown in Fig. 2 to permit the apparatus to swing about its pivotal connection to the dot and dash line position indicated as "Position 1" in Fig. 2. This corresponds to the filling position as the material may be readily introduced into the reaction chamber through the tube h. In the position designated as "Position 3," the material may be readily discharged through the tube h into a receiving receptacle Q.

In operation, the ore or other material to be treated is comminuted and introduced into the reaction chamber through the tube h while the apparatus is in "Position 1", (Fig. 2), the sleeve s being first removed, and after introduction of the material, replaced. The apparatus is then moved to "Position 2", or its "working position" and the rabble F rotated slowly by means of the pulley w. After all of the valves are closed nitrogen is introduced through pipe c into the space between the two casings until a pressure is attained equal to or somewhat higher than the treatment pressure of the reaction chamber. This pressure may be 150 pounds to the square inch. This is for the purpose of counterbalancing the pressure in the reaction chamber. A mixture of 10% sulfurous acid and 90% air under a pressure of 100 lbs. is then passed through the valve d until the pressure in the reaction chamber reaches 100 lbs. to the square inch. The chemical reaction immediately starts and if the heat developed thereby is not sufficient, an electric current may be passed through the heating coil y to bring the temperature to the required degree. On the other hand, if the temperature exceeds the required degree, cooling water or air or other fluid current may be passed through the coil r. After the reaction starts and the temperature reaches the desired degree, the valve j is opened the proper amount to permit a current of the sulfurous acid and air mixture to pass through the reaction chamber at a constant pressure of 100 lbs. to the square inch. If desirable the reaction may be augmented by means of a catalytic agent, such as the oxids of nitrogen generated by an electric arc produced by means of plug H, or NaCl, or any other suitable catalytic agent may be used, if so desired.

At suitable intervals the charge may be tested by discharging a small portion thereof for analysis. This may be done either by closing the valve d, reducing the pressure in the reaction chamber to about 10 lbs. and opening the valve l to permit some of the charge as it is dropped over the open end of tube A by the slowly revolving rabble F to be blown through the tube, or the pressure may be reduced in the reaction chamber and the apparatus tilted to "Position 3" to discharge some of the material into receptacle Q. Each time, after the sample is obtained, the pressure is again increased, the current of gases through the chamber reëstablished, and the temperature brought up to and maintained at the desired degree. At the end of a certain period a relatively large quantity of the sulfate of the metal to be recovered is formed, from which the metal may be readily obtained.

In some instances, it may be desirable to alternately reduce the pressure in the reaction chamber and then increase it to the desired amount. This may be done by simply letting down the pressure to atmospheric pressure and reëstablishing it to the working pressure or by connecting the branch pipe k with a vacuum pump and reducing the pressure through valve k′, and is for the purpose of permitting certain of the constituents to be broken up by the heat. Many substances will be decomposed by heat more readily at a low pressure than at a higher pressure. It is desirable under certain conditions to decompose some of the substances which might be in the reaction chamber, such for instance, as ferric-sulfate. When a decomposition temperature is maintained and when the pressure is sufficiently reduced the ferric-sulfate will decompose more readily, leaving the copper sulfate, if a copper ore is under treatment, as the copper sulfate will not decompose at the same pressure and temperature as ferric-sulfate.

It will be understood that the temperature, pressure and manner of producing and bringing into association the reacting constituents will vary according to the material treated and the type of apparatus used and therefore when certain materials are treated and apparatus used differing from that herein disclosed, the mode of operation herein set forth may also be different. When copper-bearing material is treated in apparatus similar to that described the temperature is preferably maintained in the neighborhood of 500° C. and the pressure at 50 to 100 lbs. to the square inch. These figures will, of course, vary for different reacting constituents used and different types of apparatus.

Water may be used in the reaction chamber to render the process a "wet process" without departing from the scope of the invention as defined in the broader accompanying claims. When water is used, however, a different form of apparatus is preferably employed, such as that disclosed in the pending application of Henry B. Hovland, Serial No. 31,898 filed June 3, 1915.

If the process is to be carried out on a large scale for commercial purposes, it may be desirable to resort to a commercial form of apparatus similar to that disclosed in application, Serial No. 30,749, above referred to and which has been designed especially for the present process.

Furthermore, in carrying out the present process on a large scale for commercial purposes, the heretofore obnoxious and for the most part useless smelter smoke, including fumes, flue dust and gases evolved, may be used as the sulfur-yielding substance. This, of course, increases the value of the process not only because the smelter smoke may be readily and cheaply obtained, but also because its obnoxious constituents are utilized.

What we claim is:—

1. The method of sulfating which consists in bringing together under superatmospheric pressure, the material to be sulfated, an oxidizing agent that is in the gaseous state at ordinary temperatures and available sulfur.

2. The method of sulfating which consists in bringing together under super-atmospheric pressure, the material to be sulfated, sulfurous acid, and available oxygen.

3. The method of sulfating which consists in bringing together under super-atmospheric pressure, the material to be sulfated, sulfurous acid and available oxygen, with heat to facilitate the reaction.

4. The method of treating ore which consists in placing the ore in a suitable chamber, subjecting the ore to the action of sulfurous acid in the presence of oxygen, maintaining the pressure in said chamber above atmospheric pressure, and augmenting the reaction by means of the catalytic action of an electric arc.

5. The method of treating ore which consists in placing the ore in a suitable chamber, subjecting the ore to the action of sulfurous acid in the presence of oxygen, maintaining the pressure in said chamber above atmospheric pressure and augmenting the reaction by means of a catalytic agent.

6. The method of treating ore which consists in placing the ore in a suitable chamber, subjecting the ore in the chamber to the action of sulfurous acid while in the presence of oxygen, and while the pressure in the chamber is above atmospheric pressure, and supplying heat to the reacting constituents when the heat of the reaction is insufficient to maintain the required temperature.

7. The method of treating ore which consists in placing the ore in a suitable chamber, subjecting the ore in the chamber to the action of sulfurous acid in the presence of oxygen, and while the pressure in the chamber is above atmospheric pressure, and maintaining a pressure on the outside of the chamber at least equal to the pressure inside the chamber.

8. The process of treating ore which consists in placing the ore in a suitable chamber, subjecting the ore to the action of sulfurous acid in the presence of available oxygen, and maintaining the pressure in said chamber above atmospheric pressure.

9. The process of sulfating ore which consists in subjecting said ore in a suitable chamber to the action of a current of a mixture of sulfurous acid and air at super-atmospheric pressure, and maintaining the required degree of heat in the chamber for the sulfating reaction.

10. The process of sulfating ore which consists in subjecting the ore in a suitable chamber to the action of a current of a mixture of sulfurous acid and air at superatmospheric pressure, for the purpose described.

11. The method of sulfating which consists in subjecting the material to be sulfated to the action of air under superatmospheric pressure in the presence of available sulfur.

12. The method of sulfating which consists in subjecting the material to be sulfated to a current of air under superatmospheric pressure in the presence of available sulfur.

In testimony whereof we affix our signatures, in presence of two witnesses.

HENRY B. HOVLAND.
GEORGE B. FRANKFORTER.

Witnesses to Hovland:
ARTHUR L. BRYANT,
VERNON T. HOUGHTON.

Witnesses to Frankforter:
EVA E. KÖNIG,
HARRY D. KILGORE.